US009634790B2

(12) United States Patent
Lee et al.

(10) Patent No.: US 9,634,790 B2
(45) Date of Patent: Apr. 25, 2017

(54) BURST-MODE OPTICAL AMPLIFICATION APPARATUS AND METHOD THEREOF

(71) Applicant: ELECTRONICS AND TELECOMMUNICATIONS RESEARCH INSTITUTE, Daejeon-si (KR)

(72) Inventors: Han Hyub Lee, Daejeon-si (KR); Sang Soo Lee, Daejeon-si (KR)

(73) Assignee: ELECTRONICS AND TELECOMMUNICATIONS RESEARCH INSITUTE, Daejeon-si (KR)

( * ) Notice: Subject to any disclaimer, the term of this patent is extended or adjusted under 35 U.S.C. 154(b) by 120 days.

(21) Appl. No.: 14/804,502

(22) Filed: Jul. 21, 2015

(65) Prior Publication Data

US 2016/0020867 A1    Jan. 21, 2016

(30) Foreign Application Priority Data

Jul. 21, 2014   (KR) ........................ 10-2014-0092126

(51) Int. Cl.
*H04B 17/00* (2015.01)
*H04L 25/03* (2006.01)
(Continued)

(52) U.S. Cl.
CPC ...... *H04J 14/0221* (2013.01); *H04J 14/0282* (2013.01); *H04Q 11/0005* (2013.01); *H04Q 11/0067* (2013.01); *H04Q 2011/0016* (2013.01)

(58) Field of Classification Search
None
See application file for complete search history.

(56) References Cited

U.S. PATENT DOCUMENTS 6,603,896 B1 * 8/2003 MacCormack ..... H01S 3/06758
                                                   359/337.1
6,928,272 B2 * 8/2005 Doi ....................... H03F 1/3294
                                                   330/149
(Continued)

FOREIGN PATENT DOCUMENTS

KR      1020090004913 A    1/2009

OTHER PUBLICATIONS

Masamichi Fujiwara, et al; "Field Trial of 79.5-dB Loss Budget, 100-km Reach 10G-EPON System Using ALC Burst-Mode SOAs and EDC", Published in Optical Fiber Communication Conference and Exposition (OFC/NFOEC), 2012 and the National Fiber Optic Engineers Conference, Mar. 4-8, 2012, pp. 1-3.
(Continued)

*Primary Examiner* — Tesfaldet Bocure
(74) *Attorney, Agent, or Firm* — Ladas & Parry LLP

(57) ABSTRACT

A burst-mode optical amplification apparatus and method is provided. The burst-mode optical amplification apparatus includes a gain saturation signal generator configured to generate a gain saturation signal for gain stabilization based on an incoming input optical signal; a wavelength multiplexer configured to wavelength multiplex the incoming input optical signal and the gain saturation signal; and an optical amplifier configured to amplify both the wavelength-multiplexed input optical signal and the wavelength-multiplexed gain saturation signal. The apparatus may further include a time delay module configured to synchronize the input optical signal and the gain saturation signal by delaying the transmission time of the input optical signal, taking into consideration the processing time needed by the gain saturation signal generator to generate the gain saturation signal.

8 Claims, 8 Drawing Sheets

(51) Int. Cl.
*H04J 14/02* (2006.01)
*H04Q 11/00* (2006.01)

(56) References Cited

U.S. PATENT DOCUMENTS

| | | | | |
|---|---|---|---|---|
| 6,931,239 | B2* | 8/2005 | Hongo | H04L 27/2623 |
| | | | | 375/296 |
| 8,891,686 | B2* | 11/2014 | Azadeh | H04B 10/695 |
| | | | | 375/295 |
| 8,934,168 | B2* | 1/2015 | He | H04B 10/2942 |
| | | | | 359/344 |
| 2004/0247057 | A1 | 12/2004 | Park et al. | |
| 2005/0041971 | A1* | 2/2005 | Lee | H04B 10/2503 |
| | | | | 398/72 |
| 2010/0014866 | A1 | 1/2010 | Kang et al. | |
| 2011/0129235 | A1* | 6/2011 | Le | H04B 10/693 |
| | | | | 398/208 |

OTHER PUBLICATIONS

Heinz G. Krimmel, et al; "Hybrid Electro-Optical Feedback Gain-Stabilized EDFAs for Long-Reach Wavelength-Multiplexed Passive Optical Networks", Publish in Optical Communication, 2009. ECOC '09. 35th European Conference on Sep. 20-24, 2009, pp. 1-2.

\* cited by examiner

BURST-MODE OPTICAL AMPLIFICATION APPARATUS AND METHOD THEREOF

CROSS-REFERENCE TO RELATED APPLICATION(S)

This application claims priority from Korean Patent Application No. 10-2014-0092126, filed on Jul. 21, 2014, in the Korean Intellectual Property Office, the disclosure of which is incorporated herein by reference in its entirety.

BACKGROUND

1. Field

The following description relates to a passive optical network (PON), and more particularly, to optical amplification technologies in a PON.

2. Description of the Related Art

A passive optical network (PON) is a subscriber network that connects a central office and a subscriber using a point-to-multipoint topology and is cost effective compared to a structure having a point-to-point topology since less central office systems and optical cables are required. A time division multiplexing-passive optical network (TDM-PON), for example, Ethernet PON (EPON) and Gigabit-Capable PON (GPON), uses one wavelength for upstream traffic and another wavelength for downstream traffic to connect a central office to subscribers. In addition, the TDM-PON uses one wavelength for upstream traffic and another wavelength for downstream traffic to connect a number of subscriber devices and a central office system. Thus, when multiple subscriber devices simultaneously transmit an upstream signal of the same wavelength to the central office system, the central office system cannot handle the situation. To address this problem, the TWDM-PON is used in order to transmit an upstream signal in burst mode. That is, each subscriber device transmits an upstream optical signal only at the transmission time that has been allocated to it by the central office system. If 'N' number of subscriber devices are connected to one central office system, subscriber device 1 and subscriber device N cannot simultaneously transmit optical signals, but rather, consecutively transmit the optical signals to the central office system. Such a manner of consecutive signal transmission is referred to as "burst transmission mode", whereby at this time, some of the subscriber devices that are connected to the central office system may not operate for reasons such as power saving. In such cases, certain segments may be void of any optical signals which are lapses in the stream.

Time and wavelength division multiplexing-passive optical network (TWDM-PON) has been developed by advancing an existing TDM-PON. The TWDM-PON is a hybrid passive optical network that combines both TDM and WDM technologies. The TWDM-PON may allow for the expansion of transmission capacity in proportion to the number of optical wavelength channels without modifying the optical distribution network used for an existing TDM network. In the TWDM-PON, upstream optical signals are transmitted and received using TDM technology, and thus they are transmitted in burst mode.

Hence, an optical amplifier in an optical line terminal (OLT) used for implementing burst mode in the TWDM-PON by amplifying an upstream signal may need to minimize signal distortion during the amplification of optical signals, and especially, needs to have a sufficient level of optical power tolerance for receiving burst-mode optical signals of different sizes. When a burst-mode signal is fed into a general optical amplifier, initially there is a sufficient increase of gain; but then the gain gradually decreases as population inversion of the optical amplifier decreases over time, which is an inherent physical characteristic of an optical amplifier. The gain decreasing time of an optical amplifier depends on the energy conversion capacities of the materials that constitute a gain medium.

Korean Published Patent Application No. 10-2009-0004913 relates to a bi-directional optical amplifier to amplify continuous downstream signals and burst-mode upstream signals as optimally as possible. However, said Korean patent application only discloses the amplification of downstream and upstream signals using a transponder and thus cannot provide any solution to effectively reduce distortion of optical signal.

RELATED ART DOCUMENT(S)

Patent Application(s)

Korean Published Patent Application No. 10-2009-0004913

SUMMARY

The following description relates to an amplification apparatus and a method thereof which can minimize distortion caused when an upstream burst-mode optical signal is amplified in a time-wavelength division multiplexing-passive optical network (TWDM-PON) whereby a plurality of optical line terminals (OLTs) and a plurality of optical network units (ONUs) communicate with each other using a number of wavelength signals.

In one general aspect, there is provided a burst-mode optical amplification apparatus including: a gain saturation signal generator configured to generate a gain saturation signal for gain stabilization based on an incoming input optical signal; a wavelength multiplexer configured to wavelength multiplex the incoming input optical signal and the gain saturation signal; and an optical amplifier configured to amplify both the wavelength-multiplexed input optical signal and the wavelength-multiplexed gain saturation signal. The gain saturation signal generator may control the optical power of the gain saturation signal based on a power of the incoming input optical signal. The burst-mode optical amplification apparatus may further include a time delay module configured to delay the time of input of the incoming input optical signal to the optical amplifier by taking into consideration the processing time needed by the gain saturation signal generator to generate the gain saturation signal. The gain saturation signal generator may generate the gain saturation signal for an incoming input optical signal, only if there are lapses in stream therein. The optical amplifier may have a stabilized population inversion state that is fixed to a certain value by the gain saturation signal.

In another general aspect, there is provided a burst-mode optical amplification method including: measuring a power of an incoming input optical signal; generating a gain saturation signal based on the measured power of the input optical signal; synchronizing the input optical signal and the gain saturation signal by delaying the transmission time of the input optical signal by taking into consideration the processing time for generating the gain saturation signal; wavelength-multiplexing the incoming input optical signal and the generated gain saturation signal; and outputting an output optical signal by sequentially amplifying the wavelength-multiplexed gain saturation signal and the wavelength-multiplexed input optical signal. The generation of the gain saturation signal based on the measured power of the input optical signal may include generating the gain saturation signal for the incoming input optical signal, only if there are lapses in the stream therein. The outputting of the output optical signal may include fixing a gain to a predetermined value by using the gain saturation signal.

Other features and aspects will be apparent from the following detailed description, the drawings, and the claims.

Figure 1:
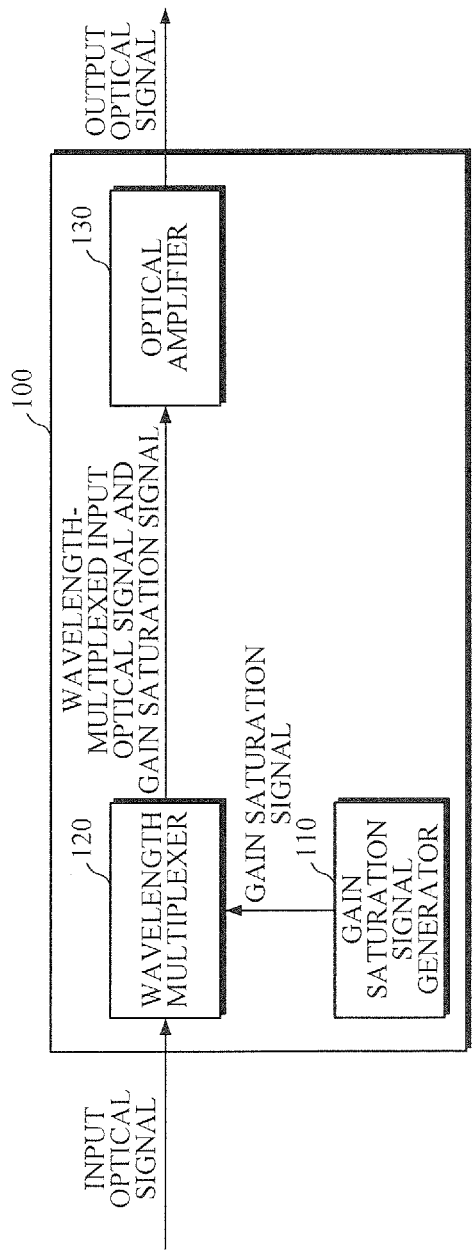
FIG. 1 is a diagram illustrating a configuration of a burst-mode optical amplification apparatus 100 according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a configuration of a burst-mode optical amplification apparatus 100 according to an exemplary embodiment.

Referring to FIG. 1, the burst-mode optical amplification apparatus 100 includes a gain saturation signal generator 110, a wavelength multiplexer 120, and an optical amplifier 130.

The gain saturation signal generator 110 generates a gain saturation signal and transmits it to the wavelength multiplexer 120 so that it may be stabilized in the optical amplifier 130. If a burst-mode optical amplification apparatus in passive optical networks receives burst-mode signals, sufficient gain of signals may be obtained in the beginning. However, in burst-mode, optical signals of a constant intensity or power are not always received; in other words, the incoming optical signal may have some lapses in its stream. Accordingly, population inversion of the optical amplification apparatus decreases, which may lead to a gradual reduction in gain and to a signal distortion. Hence, the gain saturation signal generator 110 transmits the gain saturation signal to the wavelength multiplexer 120 for so that it may be stabilized in the optical amplifier 130.

In response to receiving burst-mode input optical signals, the gain saturation signal generator 110 generates the gain saturation signal using the following two methods based on the incoming input optical signal. One method is to generate gain saturation signals aimed at filling in lapses that are void of any optical signals, not in an incoming input optical signal in which there are no lapses. In this case, the power of the generated gain saturation signal cannot be greater than the power of the incoming input optical signals. The other method is to constantly generate a gain saturation signal with a greater power than that of an incoming input optical signal regardless of the presence of incoming input optical signal. In this case, the power of the generated gain saturation signal may be preferably, but not necessarily, ten times greater than that of the incoming input optical signal.

The wavelength multiplexer 120 wavelength multiplexes the incoming burst-mode input optical signal and the gain saturation signal and transmits the resultant signals to the optical amplifier 130. The wavelength multiplexer 120 multiplexes the burst-mode input signal and the gain saturation signal using wavelength division multiplexing (WDM) technology.

The optical amplifier 130 amplifies the burst-mode input signal and gain saturation signal which have been wavelength-multiplexed by the wavelength multiplexer 120. Because the population inversion state of the optical amplifier 130 is stabilized by the gain saturation signal generated by the gain saturation signal generator 110 and thus the input signal of a smaller power than that of the gain saturation signal cannot affect the population inversion state of the optical amplifier 130, gain of the optical amplifier 130 can be fixed to a certain value. The change in the optical amplifier 130 due to the gain saturation signal will be further described with reference to FIGS. 2 and 3.

Figure 2:
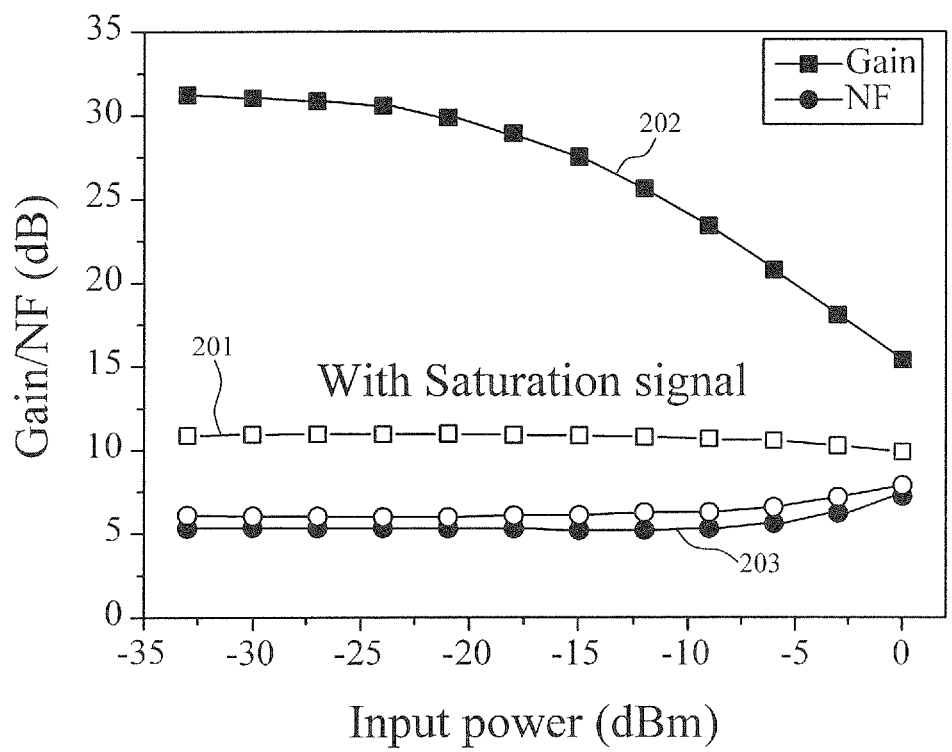
FIG. 2 is a graph showing gain and noise figure of a burst-mode optical amplification apparatus according to an exemplary embodiment.

FIG. 2 is a graph showing gain and noise figure of a burst-mode optical amplification apparatus according to an exemplary embodiment.

FIG. 2 shows an example, according to an exemplary embodiment, of the performance of a burst-mode optical amplification apparatus with regards to gain 202 and noise figure (NF) 203. It is seen that even when the power of an input optical signal changes from 0 dBm to −35 dBm or lower, the gain (saturation signal) 201 of an optical amplifier is fixed to 10 dB. This is because the population inversion state of the optical amplifier is stabilized when there is a strong gain saturation signal, and thus the low power of an input optical signal cannot affect the population inversion state of the optical amplifier.

The overshoot and settling time of an optical signal output from the optical amplifier may vary according to the power of the gain saturation signal, and they are determined by a ratio of the power of input optical signal to the power of gain saturation signal. According to the example shown in FIG. 2, when the ratio of the power of input optical signal to the power of gain saturation signal is equal to or greater than 10 dB, it is possible to maintain overshoot of 1 dB or below and maintain settling time to 1 μs or below.

Figure 3:
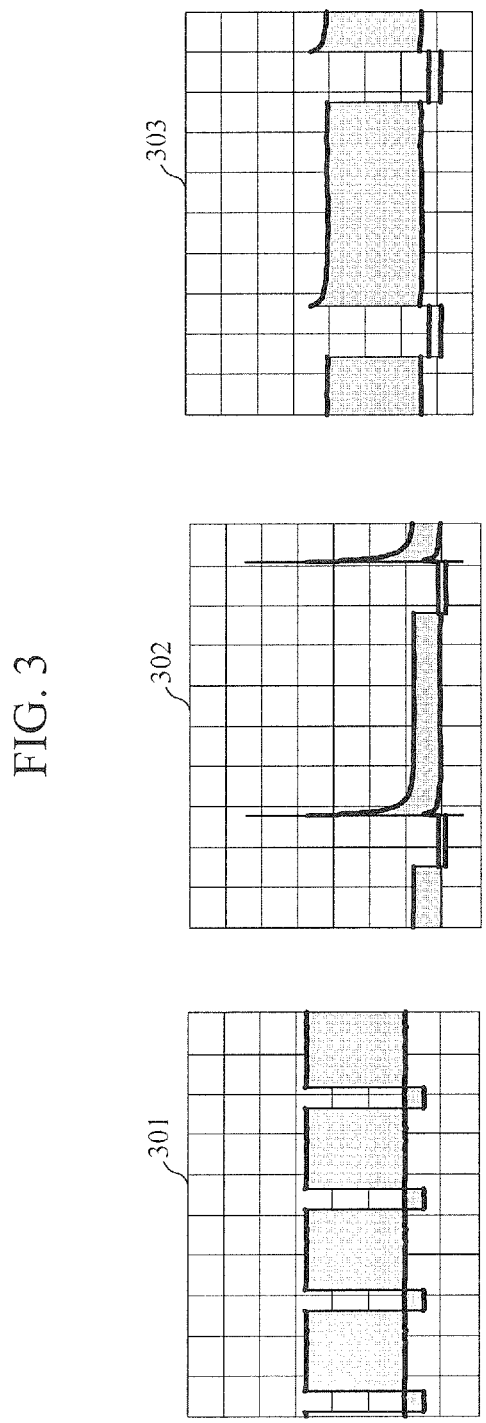
FIG. 3 shows graphs of examples of output powers of a burst-mode optical amplification apparatus according to the exemplary embodiment.

FIG. 3 shows graphs of examples of output powers of a burst-mode optical amplification apparatus according to the exemplary embodiment.

Referring to FIG. 3, reference numeral 301 represents an input optical signal, reference numeral 302 represents an output optical signal when no gain saturation signal is present, and reference numeral 303 represents an output optical signal when a gain saturation signal is present. It is seen that the output optical signal 302 exhibits a stronger transient response characteristic in the absence of a gain saturation signal, while in the presence of a gain saturation signal, the output optical signal 303 exhibits a very weak transient response characteristic. Therefore, the burst-mode optical amplifier can efficiently prevent distortion of the optical signal.

Figure 4:
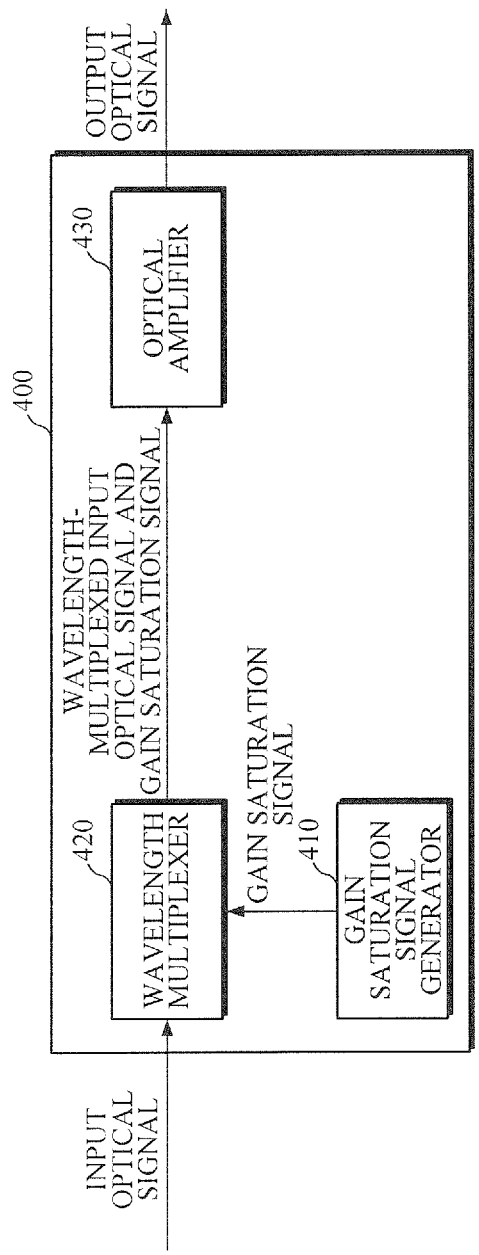
FIG. 4 is a diagram illustrating a configuration of a burst-mode optical amplification apparatus according to another exemplary embodiment.

FIG. 4 is a diagram illustrating a configuration of a burst-mode optical amplification apparatus according to another exemplary embodiment.

Referring to FIG. 4, the burst-mode optical amplification apparatus includes a gain saturation signal generator 410, a wavelength multiplexer 420, and an optical amplifier 430.

The gain saturation signal generator 410 generates a gain saturation signal to be used for gain stabilization that takes place in the optical amplifier 430 and transmits it to the wavelength multiplexer 420. If a burst-mode optical amplification apparatus in a passive optical network (PON) receives burst-mode signals, sufficient gain may be obtained in the beginning. However, thereafter, population inversion of the amplification apparatus decreases, which may lead to a gradual reduction in signal gain. Hence, the gain saturation signal generator 410 transmits the gain saturation signal to the wavelength multiplexer 420 for gain stabilization that takes place in the optical amplifier 430.

The wavelength multiplexer 420 wavelength-multiplexes the incoming burst-mode input optical signal and gain saturation signal and transmits the resultant signals to the amplifier 430. The wavelength multiplexer 420 multiplexes the burst-mode input signal and the gain saturation signal using WDM technology.

The optical amplifier 430 outputs initial output optical signals by amplifying the burst-mode input signal and gain saturation signal which have been wavelength-multiplexed by the wavelength multiplexer 420. Because the population inversion state of the optical amplifier 430 is stabilized by the gain saturation signal generated by the gain saturation signal generator 410 and thus the input signal of a lower power than that of the gain saturation signal cannot affect the population inversion state of the optical amplifier 430, gain of the optical amplifier 430 can be fixed to a certain value.

Figure 5:
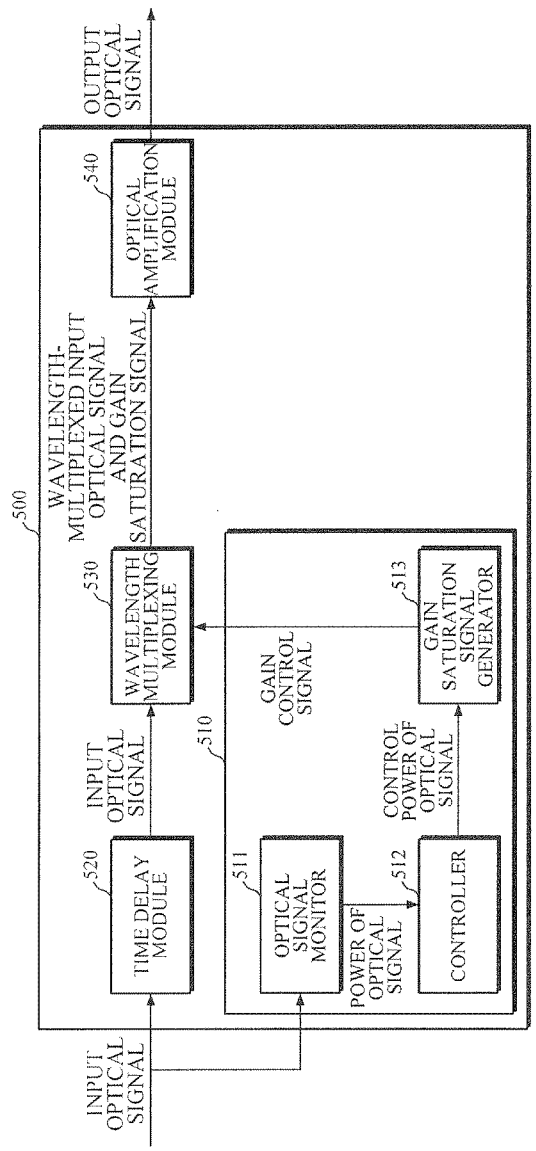
FIG. 5 is a diagram illustrating a configuration of a burst-mode optical amplification apparatus according to another exemplary embodiment.

FIG. 5 is a diagram illustrating a configuration of a burst-mode optical amplification apparatus according to another exemplary embodiment.

Referring to FIG. 5, the burst-mode optical amplification apparatus 500 includes a gain saturation signal generation module 510, a time delay module 520, a wavelength multiplexing module 530, and an optical amplification module 540.

The gain saturation signal generation module 510 includes an optical signal monitor 511, a controller 512, and a gain saturation signal generator 513.

The optical signal monitor 511 measures and monitors a power of an input optical signal being received by the burst-mode optical amplification apparatus 500. Then, the controller 512 adjusts the optical power of the gain saturation signal which takes place in the gain saturation signal generator 513 based on the power of the input optical signal measured by the optical signal monitor 511. The optical signal monitor 511 measures the power of the input optical signal and transmits the measurement result to the controller 512. By taking into consideration the power of the input optical signal, the controller 512 determines the power of the gain saturation signal that is to be transmitted to the wavelength multiplexing module 530. To minimize the processing time for the controller 512, an analog method may be more effective than a digital method.

When the controller 512 determines the power of a gain saturation signal, the gain saturation signal generator 513 generates a gain saturation signal to be used for gain stabilization that takes place in the optical amplification module 530 and transmits it to the wavelength multiplexing module 530. If a burst-mode optical amplification apparatus in a passive optical network (PON) receive burst-mode signals, sufficient gain may be obtained in the beginning. However, thereafter, population inversion of the amplification apparatus decreases, which may lead to a gradual reduction in gain. Hence, the gain saturation signal generator 513 transmits the gain saturation signal to the wavelength multiplexing module 530 for gain stabilization that takes place in the optical amplification module 540.

The wavelength multiplexing module 530 multiplexes the burst-mode input optical signal that is being received and gain saturation signal; said module then transmits the resultant signals to the optical amplification module 540. The wavelength multiplexing module 530 multiplexes the burst-mode input signal and the gain saturation signal using WDM technology.

The optical amplification module 540 amplifies the burst-mode input signal and gain saturation signal which have been wavelength-division multiplexed by the wavelength multiplexing module 530. Because the population inversion state of the optical amplification module 540 is stabilized by the gain saturation signal generated by the gain saturation signal generator 513 and thus the input signal of a lower power than that of the gain saturation signal cannot affect the population inversion state of the optical amplification module 540, gain of the optical amplification module 540 can be fixed to a certain value. The optical amplification module 540 may split the amplified output optical signal using an optical splitter which it can then distribute the split signals to one or more optical network units (ONUs).

The time delay module 520 delays the transmission time the input optical signal to the wavelength multiplexing module 530, taking into consideration the processing time taken by the gain saturation signal generation module 510. According to the present embodiment, the gain saturation signal generation module 510 controls the gain saturation signal from within the optical amplification apparatus 500 based on the power of the received input optical signal and transmits the resultant signal to the wavelength multiplexing module 530. At this time, time delay may occur in the gain saturation signal generation module 510 which measures the power of the input optical signal and controls the optical power of the gain saturation signal based on the measurement result. If a time delay occurs in the gain saturation signal generation module 510, there will be a difference between the time it takes to generate gain saturation signal and the time of input optical signal reception. Thus, the time delay module 520 synchronizes the two signals by delaying the time of the input optical signal, taking into consideration the processing time of the gain saturation signal generation module 510. The time delay module 520 may consist of optical fibers.

Figure 6:
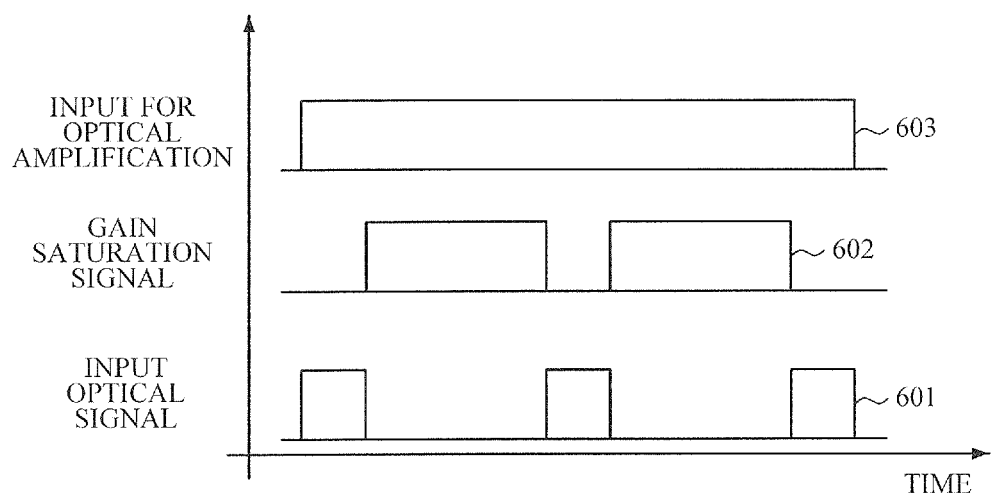
FIG. 6 is a graph showing an example of power of an input optical signal and that of a gain saturation signal in the burst-mode optical amplification apparatus of FIG. 5.

FIG. 6 is a graph showing an example of power of an input optical signal and that of a gain saturation signal in the burst-mode optical amplification apparatus of FIG. 5.

Referring to FIG. 5 and FIG. 6, if the burst-mode optical amplification apparatus receives an input optical signal 601 in which there are lapses in the stream, it generates a gain saturation signal 602, which is then supplemented to the input optical signal 601. In other words, if the incoming input optical signal 601 has no lapses, the gain saturation signal 602 is not supplemented; when the incoming input optical signal 601 has lapses, the gain saturation signal is generated so that it may fill in the lapses. Such provisions allow for the optical amplification module 540 to receive an optical signal that is of a constant intensity. At this time, difference between the time of input optical signal reception and the time it takes to generate gain saturation signal has to be minimized, which is a task that may be achieved by the time delay module 520, as it adjusts the time in which a gain saturation signal is generated in the gain saturation signal generation module 510.

An optical input that is to be amplified 603 that is the merger of the input optical signal 601 and the gain saturation signal 602 may minimize the change in population inversion of the optical amplification module 540, so that a burst-mode input optical signal in optical communication can be amplified without distortion.

Figure 7:
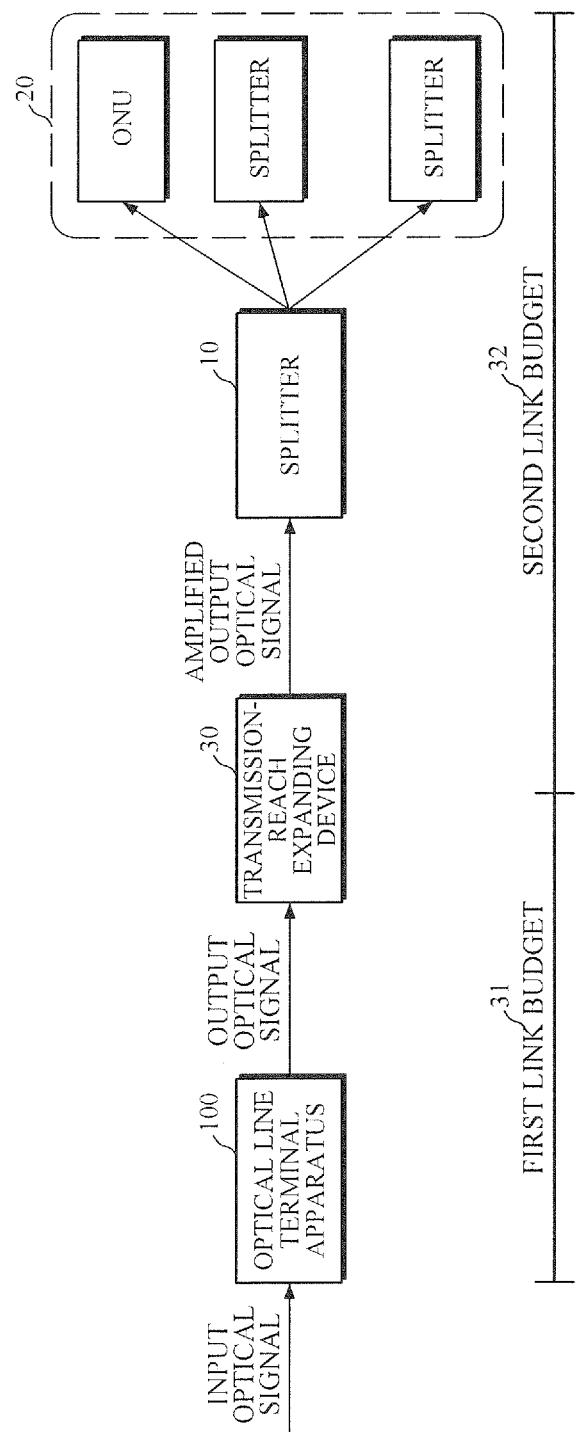
FIG. 7 is a diagram illustrating a configuration of a device for extending the transmission reach of a burst-mode optical amplification apparatus according to an exemplary embodiment of the present invention.

FIG. 7 is a diagram illustrating a configuration of a device for extending the transmission reach of a burst-mode optical amplification apparatus according to an exemplary embodiment of the present invention.

Referring to FIG. 7 in conjunction with FIGS. 1 to 5, the burst-mode optical amplification apparatus may be used for a time and wavelength division multiplexing passive optical network (TWDM-PON) or a time division multiplexing-based PON (TDM-PON), or for a transmission-reach expanding device 30 that can increase transmission reach or the number of branches of the PUN. Assuming that a link budget of the basic optical line terminal apparatus, i.e., the optical amplification apparatus 100, is a first link budget 31, the entire link budget can be increased to the sum of the first link budget 31 and a second link budget 32 by using the device 30 for extending a transmission reach. Here, the link budget refers to the maximum amount of loss that an optical link can tolerate in order to properly transmit and receive a signal without errors. The main causes of loss in a TDM-PON link are: 1) absorption losses in optical fibers that constitute an optical transmission line and 2) power losses due to branches in an optical splitter 10. As a method to increase transmission reach, reducing the number of branches in the optical splitter 10 may be considered in an effort to reduce the loss. However, as the number of branches of the optical splitter 10 is reduced, the number of ONUs 20 available for service is reduced as well. Meanwhile, the device 30 for extending transmission reach using the optical amplifier according to the exemplary embodiments of the present invention can amplify the intensity of an optical signal and thereby increase a transmission reach without reducing the number of branches.

Figure 8:
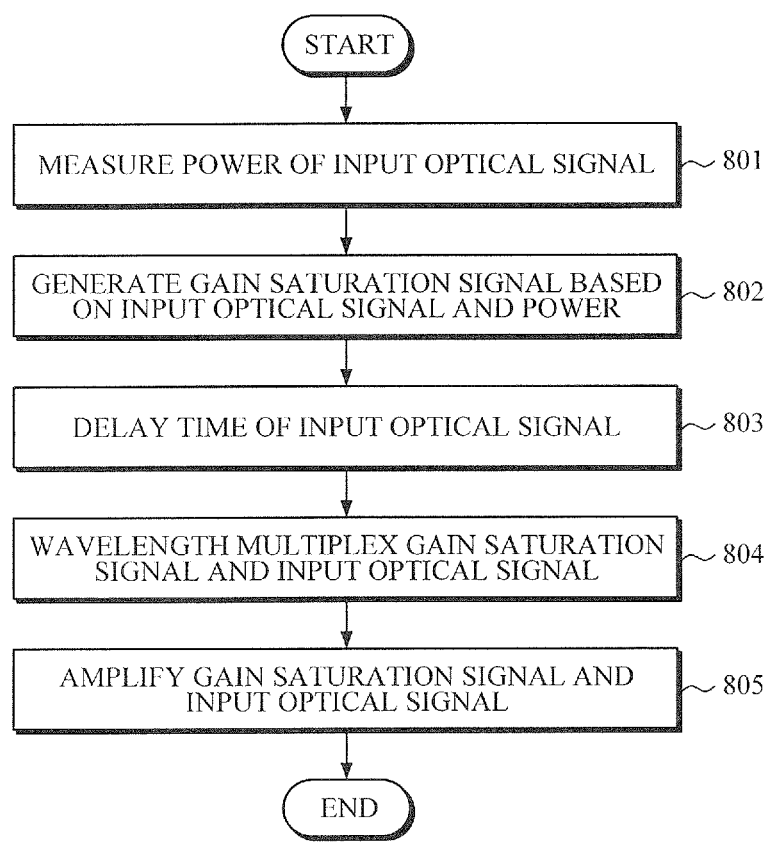
FIG. 8 is a flowchart illustrating a burst-mode optical amplification method according to an exemplary embodiment.

FIG. 8 is a flowchart illustrating a burst-mode optical amplification method according to an exemplary embodiment.

Referring to FIG. 8, first, a power of an input optical signal is measured and monitored in 801. Then A gain saturation signal is generated by adjusting its optical power in 802. At this time, the power of the incoming input optical signal is measured, and the power of the gain saturation signal is determined based on the power of the measured input optical signal. If a burst-mode optical amplification apparatus in a passive optical network (PON) receive burst-mode signals, sufficient gain may be obtained at the beginning. However, thereafter, population inversion of the amplification apparatus decreases, which may lead to a gradual reduction in gain.

In response to generation of the gain saturation signal according to the determined power of the gain saturation signal, the transmission time of the input optical signal is delayed, as depicted in 803, by taking into consideration the processing time taken for operations 801 and 802. The optical line terminal apparatus according to the exemplary embodiments controls the gain saturation signal based on the power of the incoming input optical signal. At this time, time delay may occur due to the processes of measuring the power of the input optical signal and adjusting the optical power of the gain saturation signal based on the measurement result. If time delay occurs, there will be a difference between the time it takes to generate gain saturation signal and the time of input optical signal reception. Therefore, the two signals are synchronized with each other by delaying the time of the input optical signal by taking into consideration the processing time taken for operations 801 and 802.

Then, the generated gain saturation signal and the incoming input optical signal are wavelength-multiplexed in 804. At this time, the signals are multiplexed by using WDM technology.

The wavelength-multiplexed burst-mode input signal and gain saturation signal are amplified in 805. Because the population inversion state of the optical amplifier is stabilized by the gain saturation signal generated as depicted in 802, and thus the input signal of a lower power than that of the gain saturation signal cannot affect the population inversion state of the optical amplifier, gain of the optical amplifier can be fixed to a certain value.

According to the exemplary embodiments, when there is an incoming burst-mode optical signal input, the burst-mode optical amplification apparatus and method suppresses transient response characteristics of an optical amplifier by having it maintain a constant population inversion state regardless of whether there is an incoming optical signal present, and thereby distortion that may occur during optical amplification can be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A burst-mode optical amplification apparatus comprising:
   a gain saturation signal generator configured to generate a gain saturation signal for gain stabilization based on an incoming input optical signal;
   a wavelength multiplexer configured to wavelength multiplex the incoming input optical signal and the gain saturation signal; and
   an optical amplifier configured to amplify both the wavelength-multiplexed input optical signal and the wavelength-multiplexed gain saturation signal.

2. The burst-mode optical amplification apparatus of claim 1, wherein the gain saturation signal generator controls the optical power of the gain saturation signal based on a power of the incoming input optical signal.

3. The burst-mode optical amplification apparatus of claim 1, further comprising:
a time delay module configured to delay the time of input of the incoming input optical signal to the optical amplifier by taking into consideration the processing time needed by the gain saturation signal generator to generate the gain saturation signal.

4. The burst-mode optical amplification apparatus of claim 1, wherein the gain saturation signal generator generates the gain saturation signal for an incoming input optical signal, only if there are lapses in stream therein.

5. The burst-mode optical amplification apparatus of claim 1, wherein the optical amplifier has a stabilized population inversion state that is fixed to a certain value by the gain saturation signal.

6. A burst-mode optical amplification method comprising:
measuring a power of an incoming input optical signal;
generating a gain saturation signal based on the measured power of the input optical signal;
synchronizing the input optical signal and the gain saturation signal by delaying the transmission time of the input optical signal by taking into consideration the processing time for generating the gain saturation signal;
wavelength-multiplexing the incoming input optical signal and the generated gain saturation signal; and
outputting an output optical signal by sequentially amplifying the wavelength-multiplexed gain saturation signal and the wavelength-multiplexed input optical signal.

7. The burst-mode optical amplification method of claim 6, wherein the generation of the gain saturation signal based on the measured power of the input optical signal comprises generating the gain saturation signal for the incoming input optical signal, only if there are lapses in the stream therein.

8. The burst-mode optical amplification method of claim 6, wherein the outputting of the output optical signal comprises fixing a gain to a predetermined value by using the gain saturation signal.

* * * * *